UNITED STATES PATENT OFFICE.

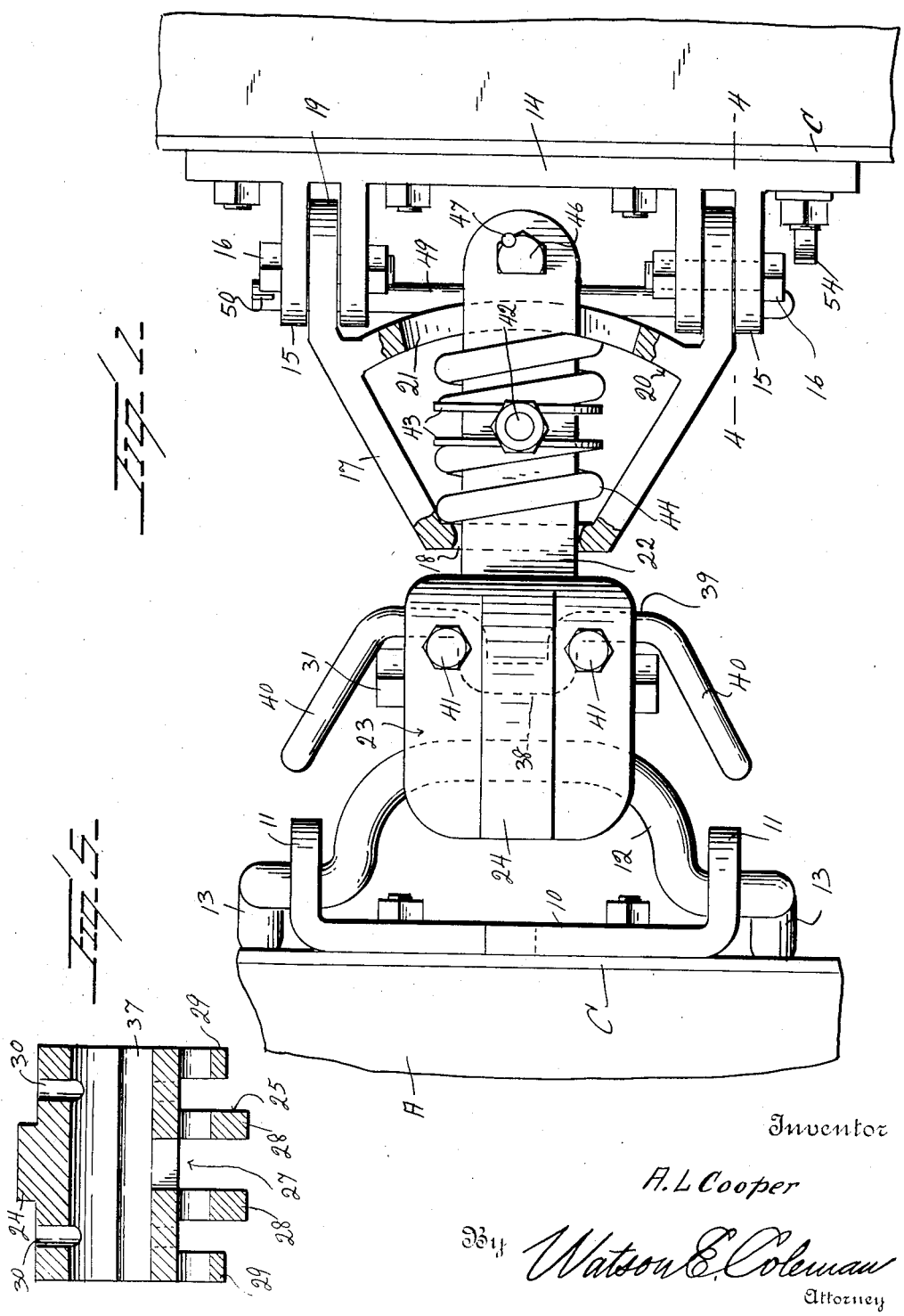

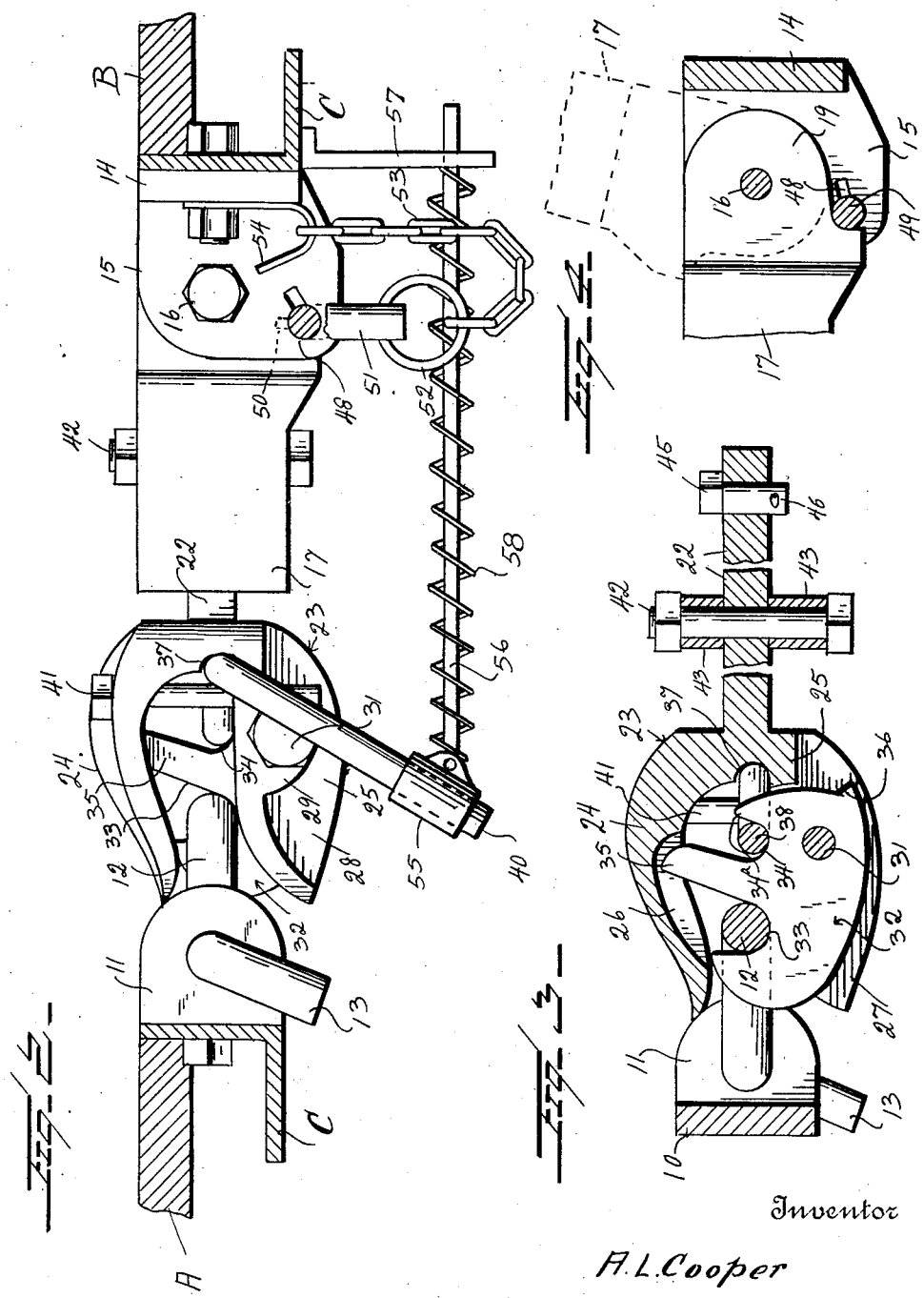

ARTHUR L. COOPER, OF LOS ANGELES, CALIFORNIA.

AUTOMATIC DRAW-BAR COUPLING FOR VEHICLES.

1,337,391.     Specification of Letters Patent.     Patented Apr. 20, 1920.

Application filed May 26, 1919. Serial No. 299,759.

*To all whom it may concern:*

Be it known that I, ARTHUR L. COOPER, a citizen of the United States, residing at Los Angeles, in the county of Los Angeles and State of California, have invented certain new and useful Improvements in Automatic Draw-Bar Couplings for Vehicles, of which the following is a specification, reference being had to the accompanying drawings.

This invention relates to coupling devices for connecting vehicles to each other, and more particularly to a means for coupling trailers such as are used with tractors, either to the tractor or to each other.

Because of the heavy duty placed upon the draw bar in coupling devices of a trailer such as are used with what are known as "trackless trains," and because also of the many turns, some of them very acute, which the tractor must take with its heavy load, the coupling devices used must have great flexibility. An ordinary coupling device, such as is used on railway cars, is of little value. Heretofore, these trailers have been coupled to each other by means of chains, the chains on one trailer having thereon a hook engaging in an eye in the pulling trailer or in the tractor.

One object of my invention is to provide a coupling device of this character which is strong enough to resist the heavy duty to which the coupling is submitted, and which is provided with a spring resisting or cushioning the shocks and strains communicated from one vehicle to the other, both when the vehicles are moving forward, when stopping, and when backing.

And a further object is to provide a coupling device so constructed that the trailers may be readily uncoupled from each other by the operation of a very simple latching device, this latching device being so constructed that the trailers will be automatically coupled when they are shifted into engagement with each other.

A further object is to provide a device of this character in which both the coupling member on the pulling trailer and the coupling member on the pulled trailer may be readily swung into a position at right angles to the line of draft, and whereby the coupling device on the pulled trailer may be dropped to a vertical position, if desired, in making short turns.

A further object is to so construct the coupler that considerable lateral motion is permitted to the draw bar, thus taking strain off the coupling in rounding curves and also allowing the trailers to track better.

A further object is to so construct the coupling as to permit the trailers to rise and fall to conform to the irregularities in the surface of the platform over which they are operating.

And a further object is to so construct the couplings that articles longer than the trailers themselves, or articles that will extend over the couplings, may be loaded on the trailers without interfering with the coupling or interfering in any manner with the uncoupling of the trailers.

Other objects will appear in the course of the following description.

My invention is illustrated in the accompanying drawings, wherein:—

Figure 1 is a top plan view of a coupling constructed in accordance with my invention;

Fig. 2 is a side elevation thereof, the coupled cars being in section;

Fig. 3 is a longitudinal sectional view of the coupling;

Fig. 4 is a fragmentary section on the line 4—4 of Fig. 1; and

Fig. 5 is a transverse section of the coupling head 24.

Referring to these figures, A and B designate the adjacent portions of two vehicles, and particularly the adjacent portions of two "trailers," this term being used to designate small trucks adapted to be connected to each other and drawn in a train by a tractor. The vehicle A is supposed to be the forward vehicle and the vehicle B the rear vehicle. The vehicle or trailer A is formed with an angle iron frame C and attached to the rear end of the trailer is a plate 10 bolted to this angle iron frame or otherwise attached thereto, and formed to provide outwardly projecting, perforated ears 11. Disposed through these perforated ears is an approximately U-shaped yoke 12, the extremities of which are disposed opposite each other and extend laterally and extend through the perforations of the ears and are then angularly bent, as at 13, so that when this yoke is disposed in a horizontal plane, these ears extend downward and toward the frame of the trailer and, bearing against the frame of the trailer, will support the yoke in approximately a horizontal plane. The yoke, however, may be turned upward so that the yoke will lie in a vertical position.

The trailer B also is provided with a frame C, and attached to this frame is the base plate 14, which is bolted to the frame or otherwise attached thereto in any suitable manner and is provided with two pairs of outwardly projecting inner ears 15, perforated for the passage of pivot bolts 16. The ears are spaced a distance of approximately 6½″ more or less from each other. Pivoted to these ears is a yoke 17, which has a transversely extending, forward, slotted wall 18 and laterally divergent side walls terminating in ears 19 which are disposed between the pairs of ears 15 and are pivoted thereto by the bolts 16 so that the yoke may oscillate in a vertical plane. The yoke is formed with an intermediate arcuate wall 20, and this wall is slotted, as at 21, for a considerable portion of its length, the slot being longer than the slot in the wall 18. Disposed through these slots is a draw bar 22 having at its outer end a head 23 formed to provide an upper jaw 24 and an under jaw 25.

The upper jaw, as shown in the sectional view in Fig. 3, is formed on its under face with a relatively short, upwardly rounded groove 26 and with a rib upon its upper face above this groove. The under face of this jaw is downwardly and forwardly curved and then upwardly curved at its extremity. The under jaw, as illustrated in Fig. 3, is formed with a longitudinally extending slot 27, with downwardly extending ribs 28 defining the slot, and with downwardly extending ears 29 at the lateral ends of the jaws, these ears being perforated. The upper face of the under jaw is curved downward and forward. Both the upper and lower jaws are formed on each side with vertically extending bolt holes 30, and bolts 31 pass through the ears 29 and the walls or webs 28 for the purpose of supporting a latch, designated generally 32. This latch, as illustrated in Fig. 3, consists of a plate of metal curved along its under edge and cut away upon its upper edge to provide a recess 33 to receive the yoke 12, and to form a recess 34 adapted to receive a locking device. The recesses 33 and 34 are divided from each other by a relatively elongated, upwardly and rearwardly extending tongue 35. This latch 32 is pivoted on the bolt 31, and the rear edge of the latch is rounded from its upper edge downward for a distance toward its lower edge, and is then formed with an outwardly extending stop 36 limiting the downward movement of the latch. The upper jaw is recessed on its under face to accommodate the relatively elongated tongue 35. The rear end of the head 24 between the upper and lower jaws is transversely recessed, as at 37, to receive a locking-rod or tumbler, the middle of which is formed to provide a crank-shaped off-set 38. Laterally of this off-set, the rod extends straight outward to form bearings upon which the rod may rock, and is then angularly extended, as at 40, these angular extensions normally projecting downward and forward when the off-set portion 38 is disposed in a horizontal plane, as illustrated in Fig. 2.

The straight portions 39 of the rod are engaged in the recess 37 and are held for rotative movement in these recesses by pins or bolts 41. This pin is preferably not screw-threaded, but is provided at one end with a head and at its lower end is engaged by a cotter pin to hold the pin in place. By removing these pins 41, the lock, consisting of the parts 38, 39 and 40, may be removed. When this lock is in place, it may be oscillated through an arc of approximately 45°. When the off-set, middle portion 38 of the locking rod is disposed in a horizontal plane, it will engage over the upwardly projecting tooth 34$^a$ formed rearward of the recess 34 in the latch plate 32 and will, therefore, lock this latch plate in its raised position. When the locking rod is turned upward, however, it will release this tooth and allow the latch 32 to drop downward. When the latch is upward, it will engage with the yoke 12 and lock the yoke and the draw bar head together. When the latch 32 is dropped, it will release the yoke, thus disengaging the trailers. It will be seen that the weight of the downwardly and forwardly extending handles 40 of the locking rod tends to hold the locking rod in its horizontal position against the upper face of the lower jaw.

The draw bar 22 is relatively thin and has a width slightly smaller than the length of the slot in the front wall 18 and normally extends through the slot 21. A bolt 42 extends vertically through the draw bar, and disposed on each side of this bolt and engaging the draw bar is a slotted disk or collar 43. Coiled compression springs 44 are disposed on opposite sides of these disks 43 and bear respectively against the front wall 18 of the yoke 17 and against the wall 22 so that the draw bar is thus yieldingly held from longitudinal movement in either direction, while permitted to oscillate laterally in the slot 21. The rear end of the draw bar is formed with a bolt hole for the passage of a bolt 45, one face of which is flattened so that the bolt cannot turn, the shank of the bolt or pin having an opening for a cotter pin 46 and the head of the bolt having a notch for a cotter pin 47.

For the purpose of supporting the yoke 17 in a horizontal plane against the action of gravity, but permitting the yoke to move upward, I form the ears 15 with registering perforations 48 for the passage of a rod 49. The perforations 48 are formed with a lateral extension, and the rod 49 at its extremity is formed with a key bit 50 and at its other extremity with an angularly directed handle 51 extending oppositely to the key bit. Thus, this supporting rod may be rotated to a position which will allow the key bit to pass through the radial extension of the openings 48 and then inserted through all of said openings and then released when the weight of the arm or handle 51 will swing the rod 49 to a position where the key bit will be out of alinement with the radial extensions of the openings 48. When it is desired to withdraw this rod 49, the rod is rotated until the key bit is in register with the radial extensions of the openings 48 and the rod is withdrawn. The handle end of the rod has preferably attached thereto a ring 52 from which a chain 53 extends to a hook 54 attached to the frame of the trailer so as to prevent the rod from getting lost. It will be obvious that the yoke 17 and the draw bar 22 may be moved upward freely without withdrawing the supporting rod 49, but that if it be desired to allow the yoke 17 and the draw bar to drop downward, then the rod 49 is withdrawn to that end.

It will be seen that my improved coupler permits the trailers or cars to be coupled automatically, as when the yoke 12 moves in between the upper and lower jaws of the coupling head 23, it will engage against the upwardly extending finger or tongue 35 and shift it rearward, thus disposing the yoke within the recess 34 and the rounded face of the tooth 34ª will act to lift the loop or cranked portion 38 of the locking rod or tumbler until the latch has lifted to its full extent and then the loop on the locking rod will engage over this tooth 34ª, locking the jaw and yoke in their coupled relation. The draft strain on the cars will be transmitted through the yoke to the locking plate 32 and thence through the draw bar head 23 to the draw bar 22, and thence through the springs 44 to the yoke 17, thence to the rear car or trailer. Strains due to backing will simply cause the locking plate 32 to move farther upward and bind against the upper jaw of the head 23. Both pulling and pushing strains will be cushioned by the springs 44 in an obvious manner. Inasmuch as the yokes 17 and 12 are pivoted, it is obvious that the two elements of the coupling may move up and down relative to each other or with each other, and that not only will the draw bar 22 oscillate laterally to accommodate lateral movements of the two vehicles, but that the yoke 12 may swing laterally between the jaws 24 and 25. Thus, I secure the utmost freedom of movement and flexibility in this coupling. When it is desired to uncouple the cars, it is only necessary to press upward on one or the other of the arms 40 of the locking device. This releases the loop 38 from its engagement with the tooth 34ª and the locking plate will then swing downward because of the exerting strain, or by gravity, thus releasing its engagement with the yoke 12.

When it is desired to use the trailer or truck detached, the coupling device thereon can be thrown upward and kept in its vertical position and so be out of the way in making short turns. If, on the other hand, it is desired, on account of the nature of the load on the truck or trailer, to drop the coupler, all that is necessary is to draw out the pin or rod 49. Inasmuch as the head of the draw bar is so connected to the yoke 17 as to permit considerable lateral motion, strain will be taken off the coupling in rounding curves and the trailers will track better. It will be noted that the coupling does not extend above the floor of the trailer, and thus articles that would extend over the coupling may be loaded on the trailers without interfering with the coupling or uncoupling of the trailers.

While I have heretofore referred to the arm 40 as being manipulated by hand to release the coupling, yet as illustrated in Fig. 2, means may be provided whereby a release may be secured through the actuation of a lever, either a hand lever or a foot lever. To this end, I have illustrated a collar 55 mounted upon the arm 40 and having pivoted thereto a rod 56 which extends forward, as for instance, to the forward end of the car or truck, and passes through a bracket 57 or other supporting means, there being a coiled contractile spring 58 surrounding this rod 56 and bearing against the bracket 57 and urging the rod forward. The forward end of the rod is to be connected to a pedal lever or hand lever, or to any other means whereby the rod may be pushed forward to cause the release of the coupling.

While I have illustrated a form of my invention which has been found thoroughly effective in actual practice, particularly when used with long trains or trailers connected to a small electric truck and moving through passages having very short turns, yet I do not wish to be limited to the details of this construction, as it is obvious that many changes might be made therein without departing from the spirit of the invention.

While I have described my device as being particularly applicable to coupling trailers such as used with tractors, yet it will be obvious that this coupling device might be used in other circumstances, as for instance, for coupling gun carriages, mine engines, or motors to cars, etc.

I claim:—

1. The combination with a vehicle having a relatively fixed, horizontally disposed coupling loop extending from one end, of a second vehicle having a relatively fixed coupling head supported in the same plane as the coupling loop comprising upper and lower jaws, a latching member pivoted rearward of its center between said jaws for vertical movement and normally having its front end hanging downward in unlatching position, said latching member being formed with a medially disposed tongue projecting upwardly when the latching member is in a raised position and adapted to be engaged by said first named coupling loop when the latter is moved into the space between said jaws, said latch having a hook-shaped portion at its forward end adapted to engage with the coupling loop when the latch is raised and holding the coupling head and loop from relative movement, and a locking device pivoted to the coupling head at a point between said jaws and in alinement with the coupling loop and disposed entirely below the upper jaw, the latch having a tooth rearward of said tongue over which the locking device engages when the latch is in its raised and coupling position whereby draft is transmitted from the coupling latch in a straight line to the locking device.

2. The combination with a vehicle having a normally horizontally disposed coupling loop mounted thereon, the coupling loop being approximately semi-circular in plan, a second vehicle having a coupling head, the coupling head having upper and lower jaws and the upper face of the lower jaw lying in approximately the same plane as the lower face of said coupling loop, a vertically movable latch pivoted to the lower jaw of the coupling head rearward of the center of the latch, and normally having its front end hanging downward in unlatching position, said latch having upon its upper face a forward recess, a rearward recess and a medially disposed tongue, the latter being adapted to be engaged by the coupling loop and forced rearward to thereby raise the latch and cause the forward recess to engage with the coupling loop, and a locking device pivoted in the head for vertical movement, normally urged to a depressed position but raised by the rotation of the latch to its locking position, said locking device engaging in the rearmost recess and thereby holding the latch raised to its coupling position, said latch when in its coupling position being disposed just above the upper face of the lower jaw and in line with the coupling loop.

3. A coupling head for vehicles having upper and lower jaws, the lower jaw being vertically slotted, a latching member disposed in the slot of said lower jaw and being pivoted adjacent its inner end to said lower jaw whereby the latching member tends to swing downward by gravity, said latching member being formed with a medially disposed tongue projecting upwardly when the latching member is in a raised position, the latch forward and rearward of said tongue being recessed and the latch being formed with a stop limiting the downward swinging movement of the latch to a position where the tongue extends upward and forward across the space between the jaws whereby the insertion of a coupling member between said jaws will rotate the latch to its raised and latching position, and a locking device comprising a tumbler pivotally mounted between the jaws and disposed entirely below the upper face of the upper jaw and adapted to be lifted by the rotation of the latch from its unlatching position to its latching position and to drop into the recess at the rear side of said tongue to thereby hold the latching member in its latching position, said tumbler having a lateral extension whereby it may be manually shifted.

4. A coupling head comprising upper and lower jaws, a vertically oscillatable latching member pivotally mounted between said jaws and swinging downward to its unlatching position, and a vertically oscillatable tumbler for locking the latching member in its latching position, said tumbler being disposed entirely below the upper jaw and having actuating means extending laterally outward from the head and disposed entirely below the upper surface of the head.

5. In a coupling, a head formed to provide upper and lower jaws, one of said jaws being slotted, a latch pivoted to the slotted jaw and operating through the slot thereof and having a recess to receive a coacting coupling member, the rear wall of said recess being upwardly extended to form a tongue against which a coacting coupling member may be engaged to force the latch to a locking position, and a locking device comprising a transverse rod pivoted between the jaws for vertical movement and having a medially disposed off-set, the latch being formed at its rear end with a projecting tooth over which said off-set portion of the locking device engages, said locking device being formed with a handle whereby it may be rotated and being normally urged to a position to engage with said tooth on the latch.

6. A coupling including a coupling head having upper and lower jaws, the lower jaw being slotted, a latch pivotally mounted upon the lower jaw and operating through the slot thereof and having an upwardly extending recess in its forward end, the rear wall of said recess being extended to form a tongue against which a coacting coupling member may bear to turn the latch to its operative position, said latch being urged by gravity to a depending, inoperative position, the latch rearward of this recess being formed to provide an upwardly extending tooth, and a locking member pivotally mounted between said jaws and at the rear end thereof having its middle portion formed to provide a latch engageable over said tooth when its middle portion lies flat upon the upper face of the lower jaw and having its ends formed to provide downwardly and forwardly extending handles whereby the locking device may be shifted to an inoperative position to permit the latch to drop.

7. The combination with a vehicle having a relatively fixed, loop-shaped coupling member extending in a horizontal plane therefrom, of a second vehicle having a coupling head mounted thereon and formed with upper and lower jaws between which the coupling member is insertible, a latch carried by the coupling head, pivoted for vertical movement therein and disposed entirely below the upper surface of the upper jaw to engage said coupling member and hold it from retraction from between the jaws, said latch being turned into an operative coupling position by the insertion of the loop-shaped coupling member between said jaws, said latch being relatively thin to thereby permit the loop-shaped coupling member to swing around the latch in a horizontal plane, and the space between said jaws extending transversely entirely through the coupling head, whereby the coupling member may swing laterally, and means disposed entirely below the upper surface of the upper jaw for locking the latch in its coupling position, said means having a lateral extension whereby it may be released.

8. A coupling head having upper and lower jaws, a latch pivotally mounted between said jaws and having a hook-shaped forward portion adapted to engage a coacting coupling member, the rear end of said latch being provided with an upwardly projecting tooth, and means for locking the latch in its raised and coupling position comprising a transverse rod rotatably mounted in the coupling head behind the latch, said rod being deflected to form a loop adapted to drop over said tooth when the latch is raised.

9. A coupling head having upper and lower jaws, a latch pivotally mounted between said jaws and having a hook-shaped forward portion adapted to engage a coacting coupling member, the rear end of said latch being provided with an upwardly projecting tooth, and means for locking the latch in its raised and coupling position comprising a transverse rod rotatably mounted in the coupling head behind the latch, said rod being deflected to form a loop adapted to drop over said tooth when the latch is raised, the rod being laterally extended and formed with an angular arm whereby the rod may be rotated to raise the locking device.

In testimony whereof I hereunto affix my signature in the presence of two witnesses.

ARTHUR L. COOPER.

Witnesses:
A. G. BEAMAN,
G. S. BELDHAM, Jr.